April 4, 1967 T. G. GRANRYD 3,312,364
SIDE DUMP TRACTOR LOADER
Filed March 2, 1962 9 Sheets-Sheet 1

INVENTOR.
Thorvald G. Granryd
BY Paul O. Pippel
Atty.

April 4, 1967 T. G. GRANRYD 3,312,364
SIDE DUMP TRACTOR LOADER
Filed March 2, 1962 9 Sheets-Sheet 2

Fig. 2.

INVENTOR.
Thorvald T. Granryd
BY Paul O. Pippel
Atty.

April 4, 1967  T. G. GRANRYD  3,312,364
SIDE DUMP TRACTOR LOADER
Filed March 2, 1962  9 Sheets-Sheet 4

Fig. 4.

INVENTOR.
Thorvald G. Granryd
BY Paul O. Pippel
Atty.

April 4, 1967  T. G. GRANRYD  3,312,364
SIDE DUMP TRACTOR LOADER
Filed March 2, 1962  9 Sheets-Sheet 9

INVENTOR.
Thorvald G. Granryd
BY Paul O. Pippel
Atty.

United States Patent Office 3,312,364
Patented Apr. 4, 1967

3,312,364
SIDE DUMP TRACTOR LOADER
Thorvald G. Granryd, Libertyville, Ill., assignor to International Harvester Company, a corporation of Delaware
Filed Mar. 2, 1962, Ser. No. 176,934
23 Claims. (Cl. 214—768)

This invention relates generally to tractor loaders, and more particularly to a front-end type tractor loader arrangement in which the bucket may be dumped either forwardly or to either side.

The primary object of the present invention is to provide a novel arrangement in a front-end type tractor loader for dumping the bucket to either side or forwardly of the tractor.

A further object is to provide a novel front-end type tractor loader that may be used to accurately and efficiently load a truck or bin by substantially no more than forward and rearward movements of the tractor on each side of the truck or bin.

It is a further object to provide a novel bucket support or carrier for a digging bucket of a front-end type tractor loader which will permit selective dumping of the bucket in either a forward direction or to either side of the tractor.

It is a further object to provide a front-end type tractor loader with a novel bucket supporting arrangement for side dumping of the bucket to either side of the tractor so that in the side dumping operation there occurs a certain rearward movement or dumping of the bucket.

It is still another object to provide a novel side dumping bucket arrangement for a front-end type tractor loader wherein a certain component of rearward dumping or movement of the bucket may be selective'y combined with a forward dumping of the bucket to produce many different bucket attitudes in the side dumping operation of the bucket.

It is still another object to provide novel hydraulic control circuit means for selectively dumping the bucket of a front-end type tractor loader of the foregoing objects.

It is further another object to provide a novel side dumping bucket arrangement including novel hydraulic circuit control means for selectively side dumping the bucket of a front end type tractor loader wherein sensing means are associated with the side dumping bucket arrangement to prevent further operation of the hydraulic circuit control means when the sensing means indicates the bucket is not properly positioned for engagement with the bucket arrangement before side dumping of the bucket.

Other objects and features of the invention will be apparent upon a perusal of the following specification and drawings in which.

The present embodiment is the preferred embodiment but it is to be understood that changes can be made in the present embodiment by one skilled in the art without departing from the spirit and scope of the present invention.

Generally, the present invention comprises a loader arrangement carried on and extending forwardly of a tractor. The tractor of the present embodiment is of the four-wheel rubber-tired type; however, the present invention may also be readily used on a crawler-type tractor.

The loader comprises a boom which is pivotally carried on the tractor and extends forward'y thereof. Certain hydraulic ram means connected between the tractor and the boom provides for raising and lowering of the forward end of the boom. A certain bucket carrier is pivotally carried on the forward end of the boom for pivotal movement about an axis disposed transversely of the tractor. A certain linkage means is connected between the tractor, the boom and the carrier and includes a hydraulic ram for operating the linkage means to pivot the carrier relative to the boom.

The bucket carrier is provided with a pair of hydraulic retractable pin arrangements and a gimbal assembly for a hydraulic ram. The bucket is connected to the carrier by the pair of retractable pin arrangements.

The bucket of the present invention comprises a bottom, rear and top wall formed of a curved p'ate with a cutting edge at the forward marginal edge of the bottom wall thereof. The side or end walls of the bucket are connected to the curved p'ate forming the bottom, rear and top walls of the bucket so that the side walls are angled upwardly and outwardly from the rear wall of the bucket to the forward marginal edges of the top and bottom walls thereof. The pin-receiving brackets which cooperate with the pair of retractable pin arrangements to carry the bucket on the carrier are secured to the underside of the side walls of the bucket.

Figure 1:
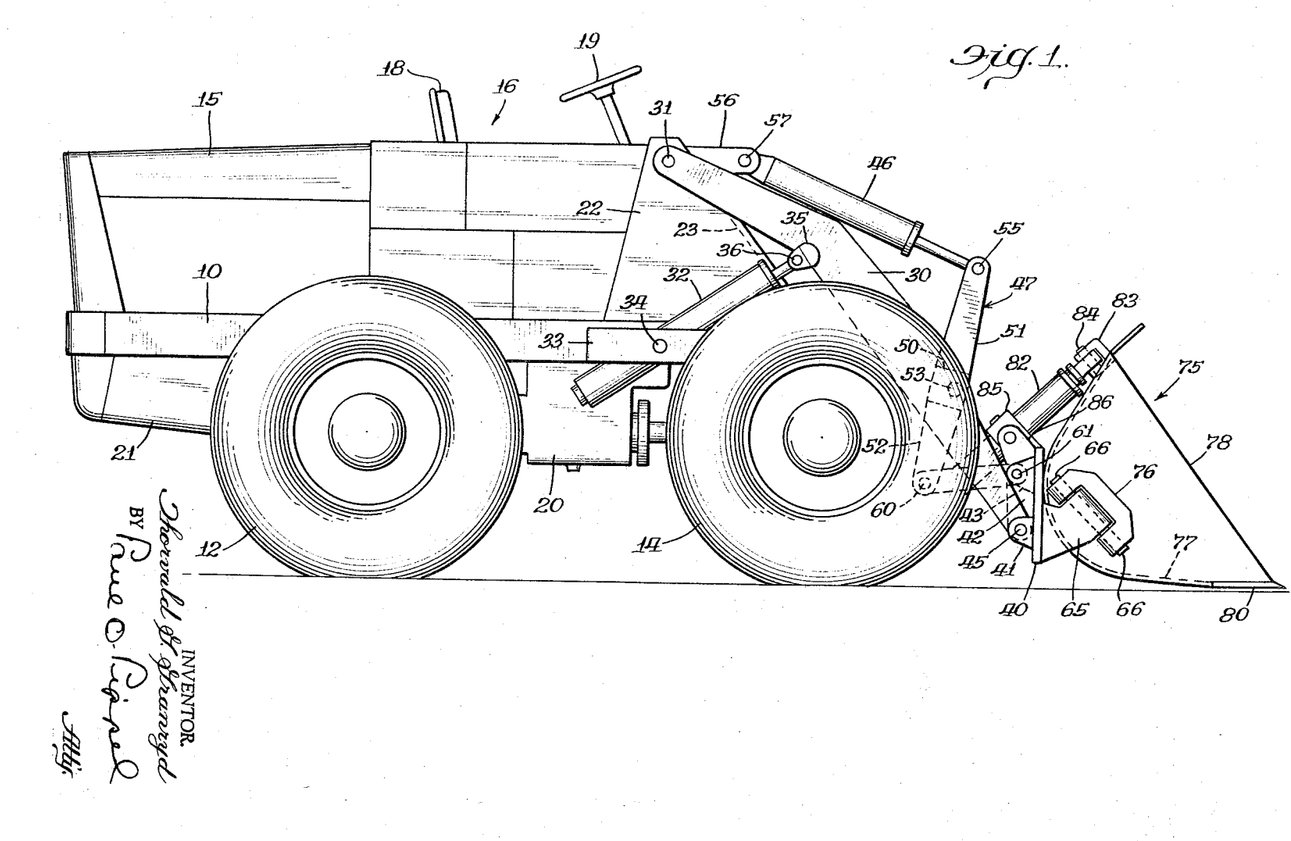
FIGURE 1 is a side elevational view of a front end type tractor loader constructed according to the present invention.
Figure 3:
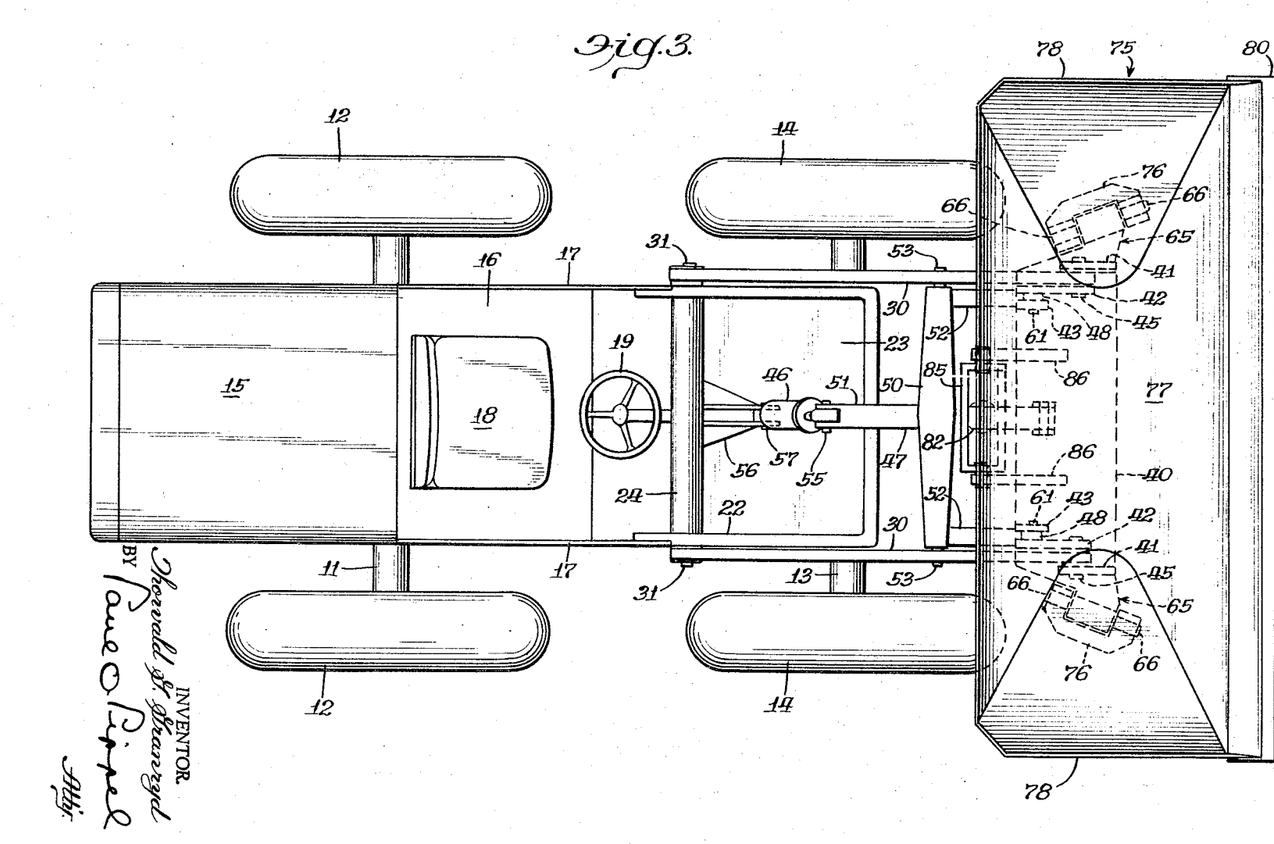
FIGURE 3 is a top plan view of the structure shown in FIGURE 2.

A hydraulic ram carried in the gimbal arrangement is pivotally connected to the upper central portion of the rearward wall of the bucket. In viewing the retractable pin arrangements, it must be kept in mind that the retractable pin arrangements are foreshortened in every view but FIGURE 7. This is due primarily to the fact that the axes of the retractable pin arrangements are disposed at a substantial angle to a verticle plane including the longitudinal center line of the tractor. This angle is apparent in FIGURE 3. The axes of the retractable pin arrangements are also inclined at an angle to the horizontal when the bucket is in the ground level digging position as shown in FIGURE 1.

Figure 2:
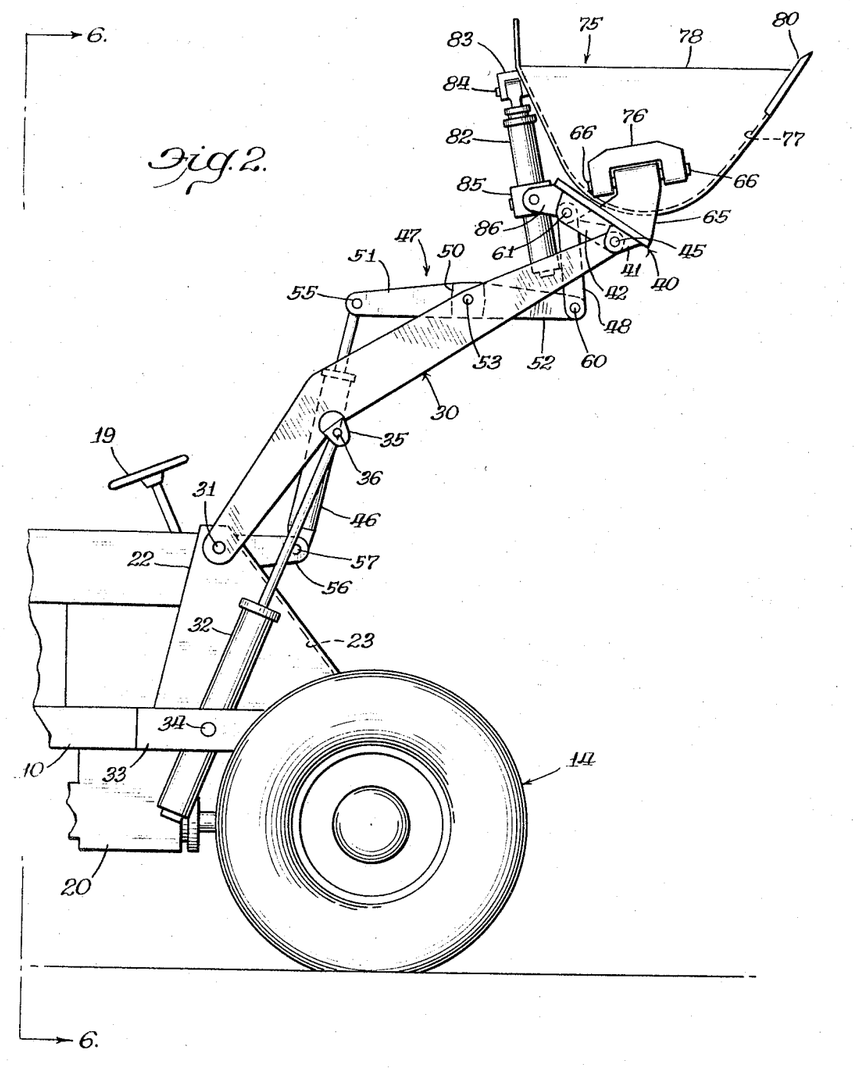
FIGURE 2 is a partial view of the structure shown in FIGURE 1 with the bucket in the high lift position.
Figure 4:
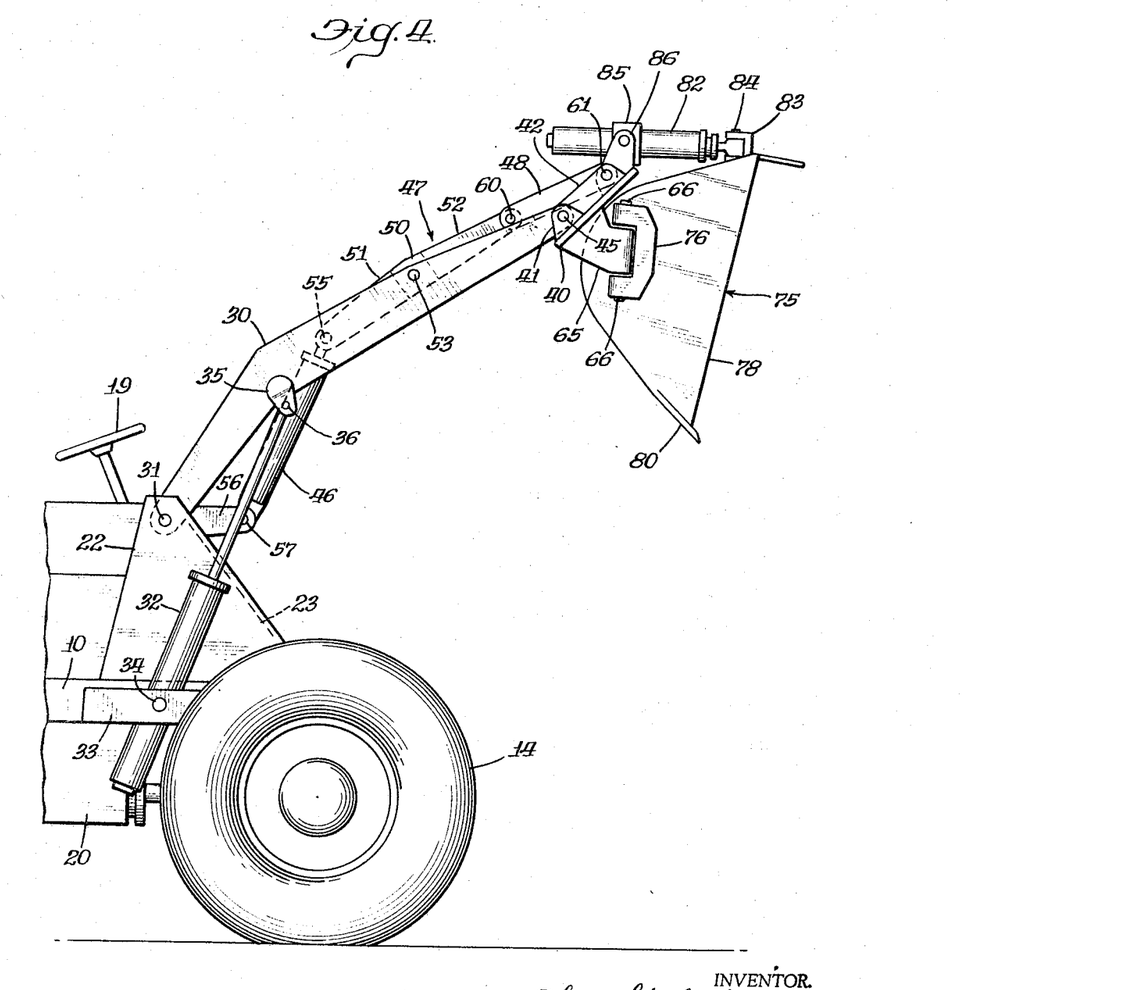
FIGURE 4 is a view similar to FIGURE 2 but with the bucket in the forwardly dumped position.
Figure 5:
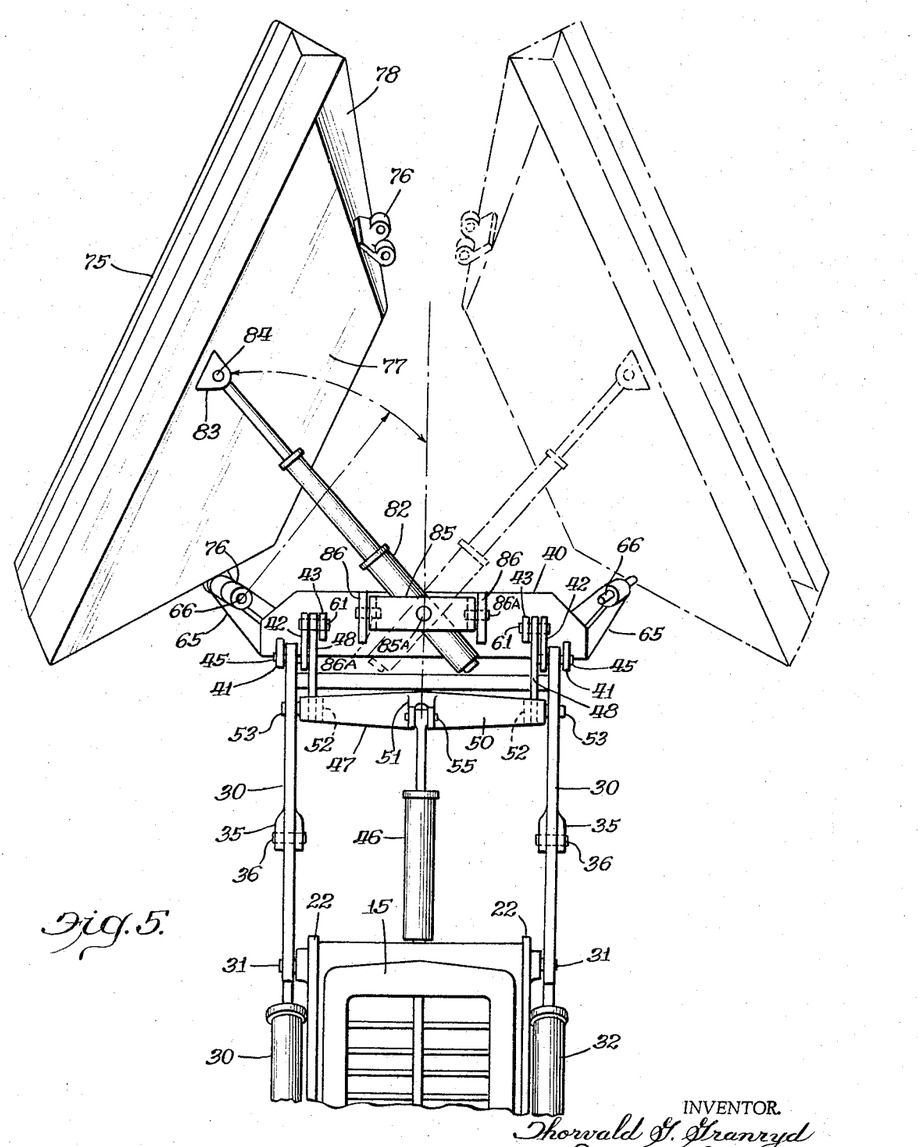
FIGURE 5 is a partial rearward elevational view of the structure shown in FIGURE 1 with the bucket in high lift and side dumped positions.
Figure 6:
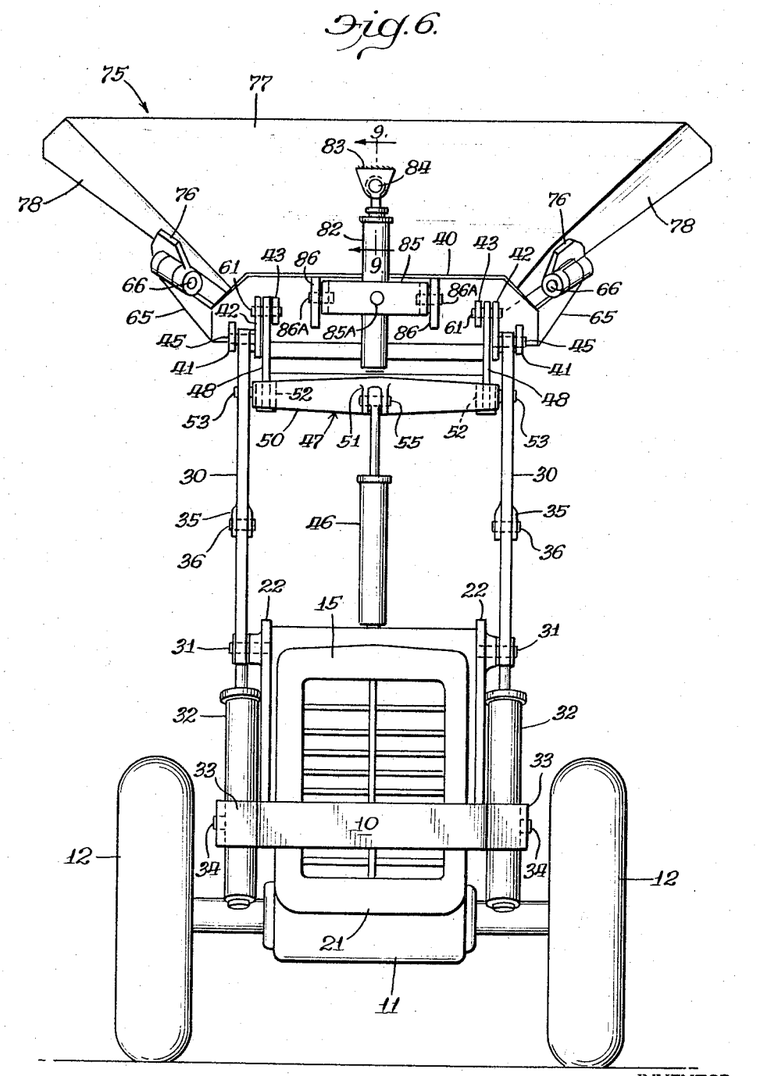
FIGURE 6 is a rearward elevational view of the structure shown in FIGURE 2.

In the operation of the invention, the bucket may be conventionally dumped in a forward direction by a substantially complete retraction of the hydraulic ram of the linkage means when the boom is in the high-lift position such as shown in FIGURE 4. By hydraulically retracting one of the pin arrangements of the carrier, the bucket may be dumped to one side when the boom is raised such as shown in FIGURE 5. If the bucket is dumped to one side from a position such as shown in FIGURES 2 and 6, the free end of the bucket will be moved toward one side and somewhat rearward'y of the tractor in the side dumping operation. However, if preparatory to side dumping, the carrier is pivoted forwardly by the linkage means until the axis of the unretracted pin arrangement is disposed downwardly and forwardly of the tractor at an angle to the horizontal which substantially equals the angle of the axis of the unlatched pin arrangement to the axis of the pin means for the carrier on the boom, the free end of the bucket will move to a substantially vertical position in the side-dumping operation. Further pivoting of the carrier in a forward dumping position beyond that angle will result in the free end of the bucket sweeping forwardly and sidewardly in the side-dumping operation. It is not necessary that the side-dumping operations occur only when the carrier is in some fixed position relative to the boom, as the forward dumping and side-dumping operations may be caused to occur substantially simultaneously and to different relative degrees to selectively vary the side-dumping positions of the bucket relative to the ground or a truck in many different patterns.

Figure 7:
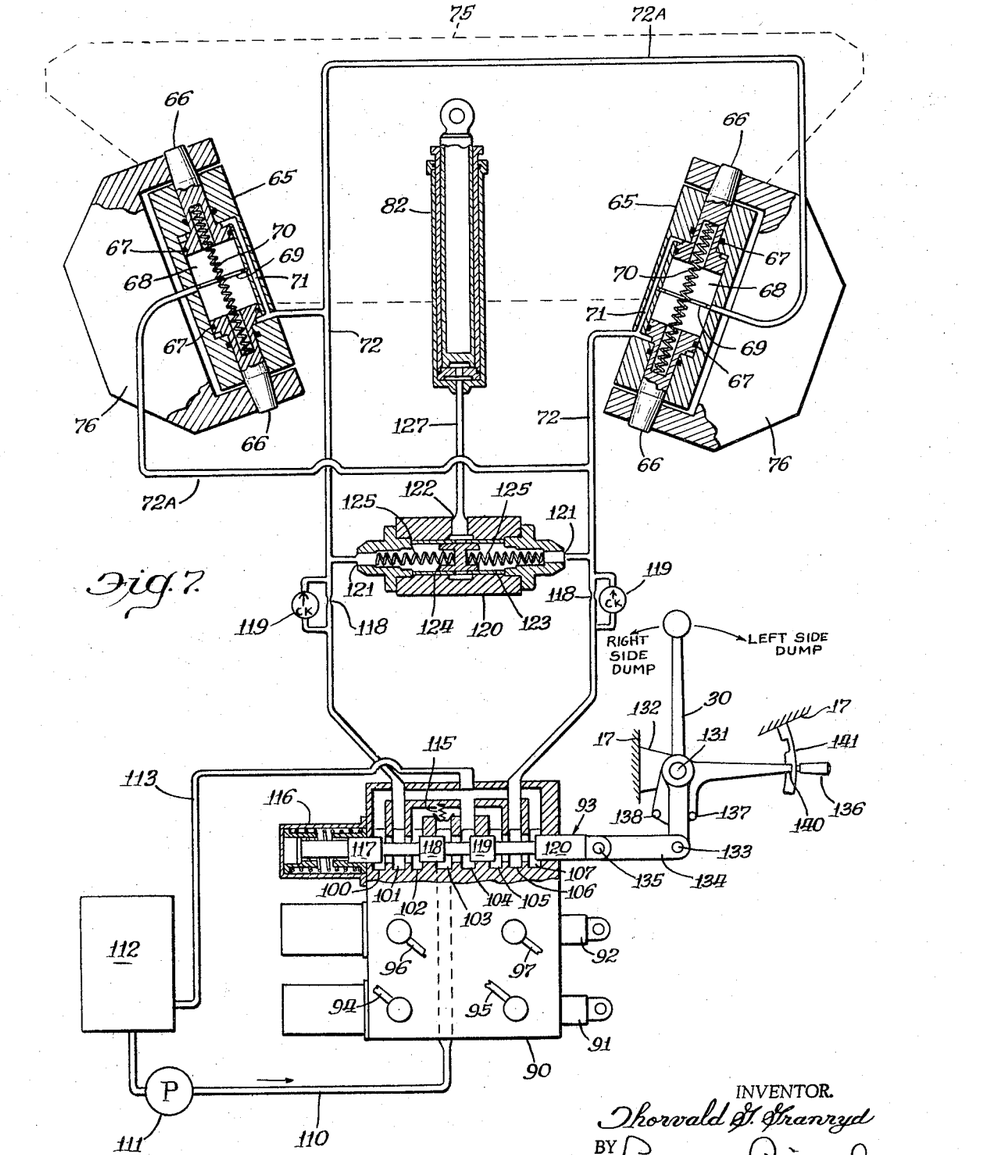
FIGURE 7 is a diagrammatic view of the hydraulic control circuit for dumping of the bucket to either side or forwardly.
Figure 8:
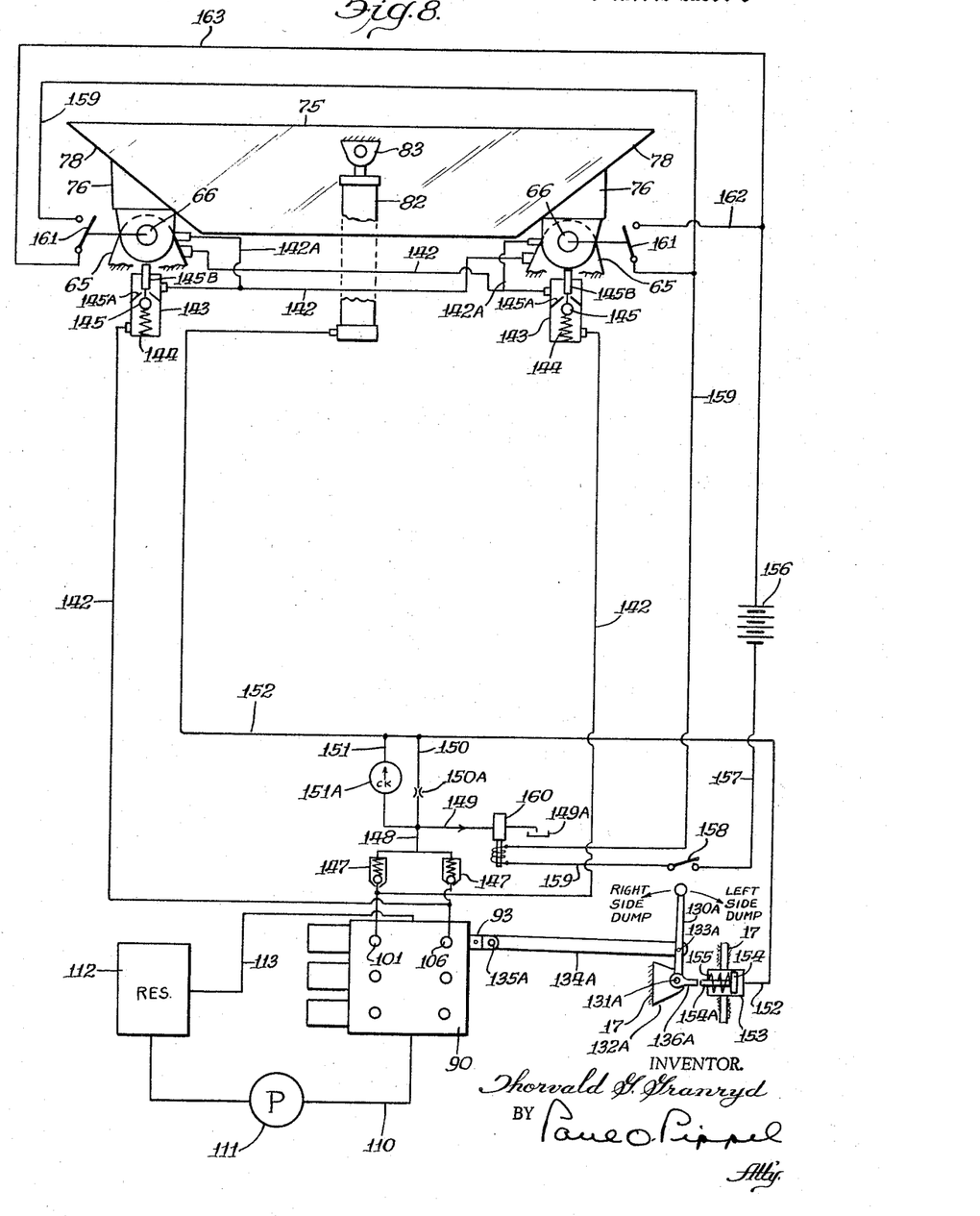
FIGURE 8 is a diagrammatic view, partially schematic but similar to FIGURE 7, showing a modified control circuit for dumping of the bucket to either side or forwardly.
Figure 8A:
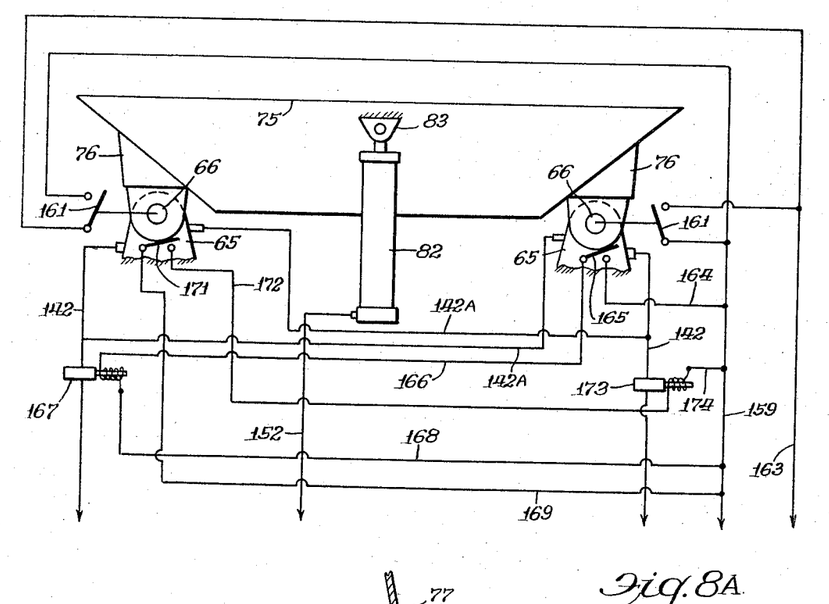
FIGURE 8A is a diagrammatic view, partially schematic, showing another modified hydraulic control circuit of FIGURE 8.

In addition to the hydraulic control circuit in FIGURE 7 for dumping the bucket to either side, the modified control circuits in FIGURES 8 and 8A provide sensing means to prevent loss of the bucket if not properly positioned for engagement on the bucket carrier before dumping to either side.

In detail, the tractor of the present embodiment comprises a frame 10 supported at the rearward end thereof on the rear axle assembly 11 and the rear wheels 12, and at the forward end on the forward axle assembly 13 and the forward wheels 14. An engine compartment 15 is carried on the rearward end of the frame 10, and an operator's compartment 16 is carried on the frame 10 forwardly of the engine compartment 15. The operator's compartment comprises a pair of spaced apart side walls 17, a seat 18 and a steering wheel 19. Although not shown in the drawings, it should be understood that the other various controls for operating the tractor and loader are carried in the operator's compartment 16. The tractor in the drawing further shows the lower part of a transmission or a transfer drive case 20 for connecting drive from the engine of the tractor to the axle assemblies, and a counterweight 21 carried to depend from the rearward end of the frame 10. The forward end of the tractor forwardly of the operator's compartment 16 is provided with a pair of upstanding plates 22, one on each side thereof for carrying the loader of the invention. The plates 22 which are somewhat triangularly shaped are supported by the frame 10, and the forward marginal edges of the plates 22 are reinforced by a plate 23, as in FIGURE 3. The upper ends of the plates 22 are interconnected by a cylindrical member 24.

The loader of the invention comprises a boom 30 which comprises a pair of boom arms positioned one on each side of the tractor. One end of each arm of the boom 30 is pivotally connected by pin means 31 to the cylindrical member 24 carried at the upper end of the plates 22.

The other end of the boom extends generally forwardly of the tractor. The forward end of the boom 30 is raised and lowered about the axis of pin means 31 by a pair of hydraulic rams 32 positioned one on each side of the tractor. The cylinder portion of each hydraulic ram 32 is pivotally carried intermediate its ends on the side of the frame 10 of the tractor by a trunnion arrangement comprising a trunnion bracket 33 and a pin 34. The rod end of each hydraulic ram 32 is pivotally connected to one of the boom arms of the boom 30 intermediate the ends thereof by a bracket 35 and a pin 36. The brackets 35 are secured to the boom by any means such as welding. The forward end of the boom 30 is raised when the hydraulic rams 32 are extended, and lowered when those rams are retracted.

The bucket carrier 40 comprises a substantially rectangular plate. The rearward side of the carrier 40 is provided with three pairs of flanges 41, 42, and 43. The flanges 41, 42 and 43 are secured to the rearward side of the carrier 40 to extend rearwardly therefrom in a certain spaced apart relationship to each other. One of the flanges 41 and one of the flanges 43 are positioned on each side of and spaced from one of the flanges 42. The flanges 43 are further positioned adjacent the upper end of the flanges 42, and the flanges 41 are positioned adjacent the lower end of the flanges 42. The forward end of each boom arm of the boom 30 is pivotally connected to one of the flanges 41 and one of the flanges 42 by a pin 45.

The linkage means which controls the pivotal position of the carrier 40 relative to the boom 30 comprises a hydralic ram 46, a lever arrangement 47 and a pair of links 48. The lever arrangement 47 comprises a box channel member 50, a lever arm 51, and a pair of lever arms 52. The box channel member 50 is pivotally carried between the boom arms of the boom 30 intermediate the ends of the boom by pins 53. The lever arm 51 is secured to one side of the box channel member 50 substantially at the longitudinal center thereof and extending perpendicularly therefrom. The lever arms 52 are secured to the opposite side of the box channel member 50 from that of the lever arm 51 and extend perpendicularly outwardly from the box channel member 50 substantially in the opposite direction from lever arm 51. The lever arms 52 are further positioned one at each end of the box channel member 50. The upper or extending end of the lever arm 51 is bifurcated and pivotally connected to the rod end of the hydraulic ram 46 by a pin 55. The head end of the hydraulic ram 46 is pivotally connected to a bracket 56 by a pin 57. The bracket 56 is carried on the tractor and is secured by any means such as welding to the upper end of the plate 23 at the forward end of the tractor. The lower or extending end of each of the lever arms 52 is pivotally connected by a pin 60 to one end of one of the links 48. The other end of each of the links 48 is pivotally connected between one of the flanges 43 and the adjacent flange 42 by a pin 61. The various described members of the linkage means are so sized that when the hydraulic ram 46 is short of fully extended, and the boom is in its lowermost position, the carrier 40 is substantially vertically disposed near ground level substantially as shown in FIGURE 1. Further, the members are so sized and the various pivot points so located that upon the full extension of the hydraulic ram 46, the carrier 40 will be pivoted rearwardly against the boom 30. The position wherein the carrier 40 is pivoted rearwardly against the boom in the lowermost position of the boom 30 is commonly called the breakout position, and when the boom is raised with the carrier in that position, there is a further automatic rearward tilting of the carrier 40 as the boom is raised to a position at about the horizontal line of vision of an operator of the tractor. Further raising of the boom will cause a forward pivoting of the carrier 40 relative to the boom to carry the carrier to a position such as shown in FIGURE 2. This automatically controlled pivotal movement of the carrier 40 relative to the boom 30 as the boom 30 is raised and lowered is determined by the relative positions of the pins 31, 57, 51 and 45. Complete retraction of the hydraulic ram 46 will move the carrier to the maximum forward dump position such as shown in FIGURE 4.

The forward side of the carrier 40 is provided with a pair of hydraulically retractable pin assemblies 65. The pin assemblies 65 are secured to the carrier 40 in a transversely spaced apart relationship to each other by any means such as welding. The detailed construction of each of the pin assemblies 65 is shown in the cross sectional view in FIGURE 7. As may be seen therein, each pin assembly 65 comprises a pair of pins 66 slidably carried along the same longitudinal axis in the body portion of the assembly 65. The inner end of each pin 66 is formed as a piston, and each piston portion of the pins 66 carries a seal 67 disposed in an annular groove in the periphery thereof. The piston portions of the pins 66 are slideably carried for reciprocating movement in a hydraulic fluid chamber 68. A snap ring 69 carried in the chamber 68 substantially at the longitudinal center thereof maintains each pin 66 confined to movement within one-half of the chamber 68. The inner end of each pin 66 is further provided with a hole which extends along the axis of the pin 66, and a compressed coiled spring 70 is positioned between the pins 66 and in the holes in the inner ends thereof to bias the pins 66 to the outwardmost positions thereof such as shown in FIGURE 7. A hydraulic fluid passageway 71 is formed in the body portion of each pin assembly 65 and is connected between each end of the chamber 68. A hydraulic fluid conduit 72 is connected to the passageway 71 and to chamber 68 through connected branch conduit 72A between pins 66 of opposite pin assembly 65 to supply hydraulic fluid under pressure thereto. Thus it may be seen that if hydraulic fluid under pressure is supplied from right conduit 72 in FIGURE 7 to the passageway 71, that hydraulic fluid will flow into the ends of the chamber 68 to apply a hydraulic fluid force to the piston portions of each of the pins 66 in the right pin assembly 65 in FIGURE 7 to cause the pins 66 to be moved toward each other against the bias of the coiled spring 70; and that the fluid will further flow intermediate ends of chamber 68 to also apply the hydraulic fluid force in cooperation with the spring-force in the left pin assembly 65 to assure that the pins 66 are in their outwardly extending positions. From the foregoing it may be seen that the pins 66 of one pin assembly 65 are hydraulically retractable into the body portion of the assembly 65 and that the pins 66 of the other pin assembly 65 are spring-restored in cooperation with the hydraulic fluid force to their outwardly extending positions.

The body portion of each of the pin assemblies 65 is shaped so that the axis of the pins 66 of each assembly 65 of the carrier 40 is positioned at an angle to the plane of the carrier 40. That angle is such that when the carrier 40 is disposed substanntially vertically as shown in FIGURE 1, the axis of the pins 66 of each pin assembly 65 extends downwardly and forwardly relative to the horizontal and transversely outwardly at a substantial angle to the longitudinal center line of the tractor. The angle of the pins 66 to the horizontal is clearly shown in FIGURE 1, and the angle of the pins to a vertical plane is clearly shown in FIGURE 3.

The bucket 75 of the present invention carries a pair of pin-receiving brackets or members 76 for cooperation with the retractable pin assemblies 65. The bucket 75 generally comprisres a curved plate 77 which defines the bottom, rear and top walls of the bucket. Each end of the curved plate 77 is cut in a curve which extends from the forward portion of the bottom wall inwardly to the center of the back wall portion and then outwardly to the upper end of the top wall of the bucket. The side walls 78 of the bucket are secured by any means such as welding to the cutout ends of the curved plate 77 to define a bucket wherein the side walls diverge outwardly from the rear wall of the bucket to the forward marginal edge of the bottom wall and the top marginal edge of the top wall of the bucket. The forward marginal edge of the bottom wall of the bucket is provided with a cutting edge 80. The pin-receiving brackets 76 are secured to the underside of the side walls 78 of the bucket 75 by any means such as welding. Each of the pin-receiving brackets 76 comprises a pair of spaced apart extending flanges having holes therethrough capable of receiving the extending end portions of the pins 66 of the pin assemblies 65. The cooperation between the pin-receiving brackets 76 and the pin assemblies 65 is clearly shown in FIGURE 7. When the pins 66 of each pin assembly 65 are positioned in the holes of the flanges of the pin-receiving brackets 76, the bucket 75 is securely carried on the carrier 40 with a portion of the rearward wall of the bucket 75 engaging the forward side of the carrier 40 substantially as shown in FIGURE 1. It is to be further understood that the preferable construction of the pins 66 is that they are tapered along a portion of their outer surface and engage with a corresponding tapered hole in outer flanges of brackets 76 as shown in FIGURE 7. The pin-receiving brackets 76 are positioned on the side walls 78 so that when the carrier 40 is positioned substantially vertically with the boom 30 in the lowered position as shown in FIGURE 1, the bucket 75 is positioned in the ground level digging position. If the pins 66 of one of the pin assemblies 65 are retracted into the body portion of the assembly 65 by the application of hydraulic fluid under pressure to the conduit 72 thereof, that side of the bucket is freed from the carrier 40, and the bucket may be pivoted in a sidewise dumping action about the axis of the pins 66 of the other pin assembly 65. It is apparent from the drawings, particularly FIGURES 3, 5 and 6, that when the bucket 75 is pivoted to one side or the other about the axis of the pins 66 of one pin assembly 65, there will be a rearward component of pivoting of the free end of the bucket because of the previously described angle of the axes of the pins 66 of the assemblies 65 to a vertical plane disposed longitudinally centrally of the tractor. This component of rearward pivoting of the bucket coupled with the selective forward pivoting of the carrier 40 relative to the boom 30 provides a unique and versatile arrangement for dumping of the bucket, especially when dumping into a bin or dump truck. The loader arrangement of the invention provides a construction which gives the operator the ability to easily spot loads in dumping, and further renders the tractor loader very stable in the high lift positions of the boom.

Figure 9:
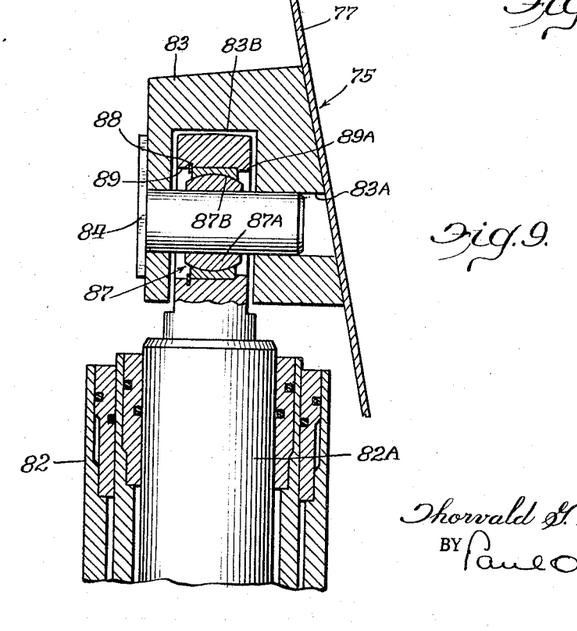
FIGURE 9 is an enlarged cross sectional view on section line 9—9 of FIGURE 6, illustrating details of the spherical bearing connected to rod end of the multi-stage ram for dumping the bucket to either side.

The means for pivoting the bucket 75 about the axis of the pins 66 of one of the assemblies 65 is a multistage hydraulic ram 82. The multi-stage ram 82 may be of any suitable type known in the art. The rod end 82A of the hydraulic ram 82 is pivotally connected by means of spherical bushing 87 shown in cross sectional detail in FIGURE 9 to a bracket 83 by a pin 84. The bracket 83 is secured by any means such as welding to the upper end of the top wall of the bucket 75 substantially at the transverse center thereof as may readily be seen in FIGURES 5 and 6. The hydraulic telescopic ram 82 is carried by pin 85A lying in a vertical plane in a gimbal arrangement 85 supported between spaced apart mounting brackets 86 by connecting pins 86A. These mounting brackets 86 carrying the gimbal arrangement 85 are on the rearward side of and at the upper transverse center of the carrier 40. When the bucket is dumped to the left or right side as shown in FIGURE 5, the outward extending ram 82 pivots about the longitudinal axis of pin 85A rotating in a vertical plane and further the gimbal arrangement 85 supporting the pin 85A and ram 82 rotates about a longitudinal horizontal axis of the two spaced apart supporting pins 86A.

Since the pins 66 lie on an oblique axis, spherical bearing 87 permits relative movement between extendable rod 82A of hydraulic ram 82 and fixed bracket 83 on bucket top wall 77. As shown in detail in FIGURE 9 fixed bracket 83 consists of a transverse bore 83A for mounting a pin 84 that assembles the outer end of rod 82A with its spherical bearing 87. The rod 82A at its outer end comprises a transverse bore 89 therethrough with a smaller sized bore 89A at one end providing a shoulder to locate outer race 87B. The outer race 87B is held firmly against shoulder 89A by split ring 88 fitting in a circular groove in bore 89 at the other end. The inner race 87A of the spherical bearing has an inner bore therethrough corresponding in diameter with that of pin 84. The rod 82A with bearing 87 is placed in transverse recess 83B which is perpendicular to bore 83A and is assembled to bracket 83 through pin 84 slidably fitting in the bore of inner race 87A but forcibly fitting in transverse bore 83A of the bracket 83. Thus as the rod and ram are extended outwardly the bucket will dump to either side about oblique axis of one of pivoting pins 66, the spherical bearing will permit relative movement between spherical contacting surfaces of inner race 87B and outer race 87A. When ram 82 and rod 82A are outwardly extended to pivot about a horizontal plane and vertical plane respectively through two pins 86A and single pin 85A on gimbal arrangement 85, bucket 75 is simultaneously pivoting to one side in FIGURE 5 about forwardly disposed oblique axis of the pins 66 on one of the pin assemblies 65 through relative movement of spherical bearing races 87A and 87B. Without the spherical bearing construction in rod 82A providing pivotal movement about the oblique axis of pins 66 relative to the pivotal movement of gimbal arrangement 85, damage would be done to the gimbal arrangement 85 including ram 82 since pivotal movement is only about the horizontal and vertical plane through spaced-apart pins 86A and pin 85A. The hydraulic ram 82 and its rod 82A is completely retracted when the bucket 75 is secured by both pin assemblies 65 to the carrier 40.

The extension and retraction of the various hydraulic rams 32, 46 and 82 are controlled by the operator of the tractor loader in selectively operating a control valve such as control valve 90 of FIGURE 7. The control valve 90 is carried in the operator's compartment 16 of the tractor and comprises a valve body having three valve spools 91, 92 and 93 slidably carried therein. A number of hydraulic fluid conduits are connected into the valve 90 and extend to various ones of the hydraulic rams to provide for selective operation of those rams. The conduits 94 and 95 which are associated with the valve spool 91 are connected to the hydraulic ram 46 for selective pivoting of the carrier 40 relative to the boom 30. The hydraulic fluid conduits 96 and 97 which are associated with the valve spool 92 are connected to the hydraulic rams 32 for selectively raising and lowering the boom 30. The valve spools 91 and 92 and the portions of the valve body associated therewith may be constructed in any suitable form known in the art.

The valve spool 93 for side dumping of the bucket 75 is slidably carried in a valve bore having the annular grooves 100, 101, 102, 103, 104, 105, 106 and 107 formed therein. The annular groove 103 is connected by a passageway through the valve body to one end of a hydraulic fluid conduit 110. The other end of the hydraulic fluid conduit 110 is connected to the pressure side of a hydraulic fluid pump 111. The suction side of the pump 111 is connected by an obvious conduit to a hydraulic fluid reservoir 112. One end of a hydraulic fluid conduit 113 is also connected into the reservoir 112. The other end of the hydraulic fluid conduit 113 is connected by suitable fluid passageways formed in the valve body into annular grooves 100, 104 and 107. Annular groove 101 is connected through the valve body to one end of the hydraulic fluid conduit 72 for the retractable pin assembly 65 on the left side of the carrier 40 and to the branch conduit 72A connected to the right pin assembly 65 at the intermediate portion of chamber 68. The annular groove 106 is connected through the valve body to one end of the hydraulic fluid conduit 72 for the retractable pin assembly 65 on the right side of the carrier 40 and to the branch conduit 72A connected to the left pin assembly 65 at the intermediate portion of chamber 68. A passageway is formed in the valve 90 between annular grooves 102 and 105 and that passageway is connected to annular groove 103 by a check valve 115. The check valve 115 will permit substantially free fluid flow from annular groove 103 through the passageway to annular grooves 102 and 105 but will prevent any fluid flow in the opposite direction.

One end of the valve spool 93 is provided with indexing means 116 which serves to spring bias the valve spool 93 to the center position shown in the drawing. The indexing means 116 may be of any suitable type known in the art. The valve spool 93 is further provided with four lands 117, 118, 119 and 120. In the center neutral position of the valve spool 93, the hydraulic fluid flow from the pump 111, entering annular groove 103, will flow into annular groove 104, and through the valve body to conduit 113 to return to the reservoir 112. Further in the center neutral position of the valve spool 93, the conduit 72 for the left retractable pin assembly 65 is connected through annular grooves 101 and 100 to the reservoir return conduit 113. Also, the conduit 72 for the right retractable pin assembly 65 is connected to the reservoir return conduit 113 through annular grooves 106 and 107.

Each of the conduits 72 is provided with an orifice 118 serving to reduce the volume of fluid flow through conduits 72. Each of the orifices 118 is bridged by a check valve 119 which will permit free fluid flow about orifices 118 in a direction from the valve 90 to the pin assemblies 65 but which will block any fluid flow therethrough in the opposite direction. A check valve 120 is also provided and comprises two inlets 121 and an outlet 122. The inlets 121 are connected through the valve bore 123 to the outlet 122. A valve spool 124 is slidably carried in the valve bore 123 and is biased by a pair of compressed coiled springs 125 to normally block the outlet 122. The compressed coiled springs 125 are selected to maintain outlet 122 blocked until the hydraulic fluid pressure at one of the inlets 121 is substantially greater than that pressure which will cause retraction of the pins 66 of the pin assemblies 65. Each of the inlets 121 is connected by a conduit into one of the conduits 72 between the orifice 118 and the connection of conduit 72 to one of the pin assemblies 65. The outlet 122 of the valve 120 is connected to one end of a conduit 127. The other end of the conduit 127 is connected to the multi-stage hydraulic ram 82.

The spool 93 is moved by a lever 130. The upper end of the lever 130 is provided with a handle portion by which the operator of the tractor loader may pivot the lever 130. The lever 130 is pivotally carried intermediate its ends on a pin 131. The pin 131 is carried by a bracket 132 on one of the side walls 17 in the operator's compartment 16. The lower end of the lever 130 is pivotally connected by a pin 133 to one end of a link 134. The other end of the link 134 is connected by a pin 135 to the valve spool 93. The lever 130 is limited to movement to either the left-side or right-side dump positions by a selector lever 136. The lever is journaled on pin 131 and one end of the lever 136 is provided with a pair of spaced apart pins 137 and 138 which are positioned one on each side of the lower end portion of the lever 130 and project into the plane of pivoting of the lower portion of the lever 130. The other end of the lever 136 is provided with a pawl 140 which cooperates with a detent 141. The detent 141 is secured within the operator's compartment 16 to one of the side walls 17 thereof. When the pawl 140 is positioned in the lower notch of the detent 141 as shown in the drawing, it may be seen that the lever 130 is movable in the direction of the left-side dump position. The pin 137 will prevent the lever 130 from being moved toward the right-side dump position. When the pawl 140 is in the upper notch of the detent 141, the pin 138 will engage the side of the lower portion of the lever 130 to prevent movement of the lever 130 toward the left-side dump position. However, the lever 130 may then be moved toward the right-side dump position. The selector lever 136 thus permits the operator to select the sidewise direction of dumping before the lever 130 is moved to cause sidewise dumping in the selected direction.

Assuming that the lever 136 is positioned as shown in the drawings, permitting left-side dump of the bucket 75, movement of the lever 130 toward the left-side dump position will cause the spool 93 to be moved inwardly of the valve bore. In this operated position of the valve spool 93, land 120 will block annular groove 107 from fluid communication with annular groove 106, land 119 will block annular groove 103 from fluid communication with annular groove 104, and land 118 will block annular groove 101 from fluid communication with annular groove 102. Hydraulic fluid under pressure in annular groove 103 will then flow through the check valve 115 into annular groove 105 into annular groove 106. From annular groove 106 the hydraulic fluid under pressure will flow through the conduit 72 for the right-side pin assembly 65. The hydraulic fluid in that conduit 72 will flow through the check valve 119 and into the passageway 71 in the right-hand pin assembly 65 and simultaneously the fluid will further flow through the connected branch conduit 72A to center portion of chambers 68 of left-hand pin assembly 65. From the passageway 71 the hydraulic fluid will flow into each outer end of the chamber 68 to cause a retraction of the pins 66 thereof. From passageway 72A the flow into chamber 68 of left pin asembly assures that spring biased pins 66 are extending outwardly lockingly engaging left member 76. With the pins 66 of the right-side pin assembly 65 retracted, the pin-receiving member 76 on the right-hand side of the bucket is freed from the pin assembly 65 thereof, with the pins 66 of the left-side pin assembly 65 outwardly extended to lockingly engage left pin receiving member 76, and then as the pressure of the hydraulic fluid in conduit 72 increases, that hydraulic fluid pressue in acting on the valve spool 124 of the valve 120 through the inlet 121 will upon reaching a certain pressure move the valve spool 124 toward the inlet 121 of the left-side conduit 72. Hydraulic fluid will then flow from the valve bore 123 through the outlet 122 and the conduit 127 to the multi-stage hydraulic ram 82. The multi-stage hydraulic ram 82 will then be extended to pivot the bucket 75 about the axis of the pins 66 at the left side of the carrier 40 thereby dumping the bucket to the left side.

If the lever 130 is then returned from the left-side dump position to the center position, the valve spool 93 will be restored to the position shown in the drawing. The hydraulic fluid under pressure from annular groove 103 will then be directed into annular groove 104, and from annular groove 104 through the conduit 113 to the reservoir 112. The bucket 75 by virtue of its empty weight will cause the multi-stage hydraulic ram 82 to be retracted, thereby lowering the right side of the bucket 75 toward the right side of the carrier 40. Because of the orifice 118, sufficient hydraulic fluid pressure will be maintained in the valve bore 123 to keep the valve spool 124 from blocking the outlet 122 until the ram 82 is substantially completely retracted. The returning hydraulic fluid flowing through orifice 118 and conduit 72 will flow into annular groove 106, and from annular groove 106 will flow into annular groove 107 and back to the reservoir 112 through the conduit 113. When the ram 82 is substantially completely retracted, the pin-receiving member 76 at the right side of the bucket will again be positioned to receive the pins 66 of the pin assembly 65 at the right side of the carrier 40. After the valve spool 124 of the valve 120 is restored to again block the outlet 122, the hydraulic fluid pressure in conduit 72 for the right side will continue to drop as fluid flows through conduit 72 and orifice 118 to the reservoir 112. The coiled spring 70 in the pin assembly 65 for the right side will cause the pins 66 thereof to be moved outwardly into the flange portions of the pin receiving member 76 to again lock the bucket 75 at the right side of the carrier 40.

The dumping operations of the bucket toward the right side direction are substantially similar to those previously described for the left side dumping operation. To dump the bucket 75 to the right side, the lever 136 is moved so that the pawl 140 engages the upper slot of the detent 141. The lever 130 may then be moved by the operator to the right side dump position. Hydraulic fluid under pressure from the pump 111 will then be directed through the condut 72 for the pin assembly 65 at the left side of the carrier 40 to retract the pins 66 thereof to permit the bucket to be dumped to the right side; and the hydraulic fluid will be further directed through branch conduit 72A connected intermediately to chamber 68 of right pin assembly 65 assures that spring biased pins 66 are extending outwardly to lockingly engage pin receiving member 76. Hydraulic fluid pressure in the conduit 72 and the valve 120 will rise and upon reaching a certain hydraulic fluid pressure will cause operation of the valve 120 and upon operation of the valve 120, hydraulic fluid will be delivered to the multi-stage ram 82 to cause an extension thereof dumping the bucket 75 to the right side.

FIGURE 8 shows another modification of the control circuit shown in FIGURE 7. Corresponding reference numbers in FIGURE 8 indicate corresponding and like parts in FIGURE 7; for example in FIGURE 8 control valve 90 is the same as in FIGURE 7. The modifications in FIGURE 8 control circuit are to provide sensing devices that prevent dumping of the bucket 75 to either side if the pin receiving members 76 and pin assemblies 66 are not in proper engaged position and to provide another arrangement for locking the operator control lever in either side dump position.

Specifically, annular groves 101 and 106 are connected to the right and left conduits 142 which are connected to a mechanical sensing device 143 mounted on the bucket carrier adjacent each of the pin assemblies 65 by any suitable means known in the art. The mechanical sensing device 143 provides a spring biased check valve 145 urged against its valve seat 145A by spring 144. Connected to the check valve 145 is an outwardly projecting feeler member 145B that extends beyond the sensing device body portion. The purpose of the sensing device 143 is to determine that the pin receiving member 76 is positioned on the pin assembly 65 to lockingly engage the pins 66 when outwardly extended. Thus if the pin receiving member 76 is in porperly engaged position on the pin assembly 65, the feeler member 145B is moved to open the check valve 145 against the spring bias to provide flow of pressure fluid to the opposite pin assembly 65 through conduit 142 for retraction of the pins 66 therein. A branch conduit 142A connected to the conduit 142 is connected to the other open assembly 65 to assure full outward extension of pins 66 in sensed pin receiving member 76 as described in the operation of the control circuit in FIGURE 7.

If the bucket 75 is to be dumped to the right side the operator control lever 130A is pivoted by the operator to the right side dump position in FIGURE 8 providing pressure fluid from pump 111 through annular groove 101 in right conduit 142. If right sensing device 143 indicates that right pin receiving member 76 is properly positioned with respect to right pin assembly 65, check valve 145 is in the open position through inward movement of feeler member 145B by properly positioned right pin receiving member 76 and provides pressure fluid flow to conduit 142 connected to the left pin assembly 65 causing retraction of pins 66 therein. Branch conduit 142A connected to conduit 142 assures outward extension of pins 66 in right pin assembly 65 to lockingly engage properly positioned right pin receiving member 76. Then as left pins 66 have been fully retracted, fluid pressure increases in conduit 142 to open left pressure regulated check valve 147 to provide fluid flow to conduit 148. The coiled spring in each regulated check valve 147 is selected to maintain check valve 147 in closed position until the hydraulic fluid pressure in conduit 142 is substantially greater than that pressure which will cause retraction of the pins 66 in the pin assemblies 65.

Fluid flow conduits 149, 150 and 151 are parallel connected to conduit 148. Conduit 151 includes a pressure regulated check valve 151A that permits pressure fluid flow in the direction as indicated by arrow in FIGURE 8. Orifice 150A in conduit 150 restricts the flow of fluid in either direction. Conduit 149 functions as a bypass to conduct all fluid to reservoir 149A through normally open solenoid valve 160. It is to be understood that bypass conduit 149 could have been connected to reservoir 112 but additional reservoir 149A has been shown in the drawings for purposes of clarity.

A second sensing device in combination with the mechanical sensing device 143 provides further assurance that the pin receiving members are properly positioned with respect to outwardly extending pins 66. Specifically, the second sensing device consists of an electrical circuit comprising a battery source 156, lines 157 and 159 with a normally open operator switch 158 connected therebetween, normally open solenoid operated valve 160 connected to line 159, normally open right micro-switch 161 connected across lines 159 and 163 through line 162, and normally open left micro-switch 161 also connected across lines 159 and 163. The micro-switch 161 is of any suitable construction known in the art and is shown in the open position in FIGURE 8. The micro-switch 161 is urged to closed position when the pins 66 are fully outwardly extended in the pin holes of pin receiving member 76. Micro-switch 161 is mounted in a manner within the skill of the art on pin receiving member 76 to indicate only when the pins 66 have been fully outwardly extended to lockingly engage the pin holes of member 76. Thus with the operator control lever 130A in right side dump position as mentioned above, right micro-switch 161 will be urged only to closed position when right pins 66 have been extended by pressure fluid in right pin assembly 65. Then the electrical circuit will be completed up to operator control switch 158.

When the operator closes switch 158, the electrical sensing circuit is completed energizing solenoid valve 160 to closed position terminating bypass fluid flow through bypass conduit 149 to reservoir 149A and redirecting fluid flow through check valve 151A and restricted orifice 150A to line 152 connected at one end to ram 82 and at the other end to cylinder 153. It is to be understood that operator control switch 158 can readily be mounted on the operator end of control lever 130A in any suitable manner within the skill of the art.

The other arrangement for locking the operator control lever 130A in either side dump position will now be discussed. The operator control lever 130A is connected to the valve spool 93 through connecting link 134A pinned at one end to the control lever 130A and pinned at the other end 135A to the spool 93. Operator control lever 130A at its lower end is supported on shaft 131A and fixed at one end thereto. The other end of shaft 131A has fixed thereto a rearward projection member 136A in fixed angular relationship to the operator control lever 130A. The shaft 131A between its ends is bearingly supported for rotation on bracket 132A. Thus as the lever 130A is moved angularly to either side dump position, the member 136A is correspondingly angularly moved through the connecting shaft 131A. Bracket 132A and cylinder 153 are both separately and fixedly attached to the operator's compartment wall 17 by some means such as welding in FIGURE 8, so that the projection member 136A and longitudinal reduced portion 154A in cylinder 153 are operatively associated as discussed hereinafter in detail.

To prevent the operator from changing the operator control lever 130A to left side dump position while the ram 82 is being energized to dump the bucket 75 to the right side, cylinder 153 includes a spring biased piston 154 having a reduced longitudinal portion 154A extending beyond the spring end of the cylinder 153 that underlappingly engages projection member 136A on shaft 131A to lockingly hold the operator control lever 130A in the right side dump position. The spring 155 should be selected of a predetermined strength to retract the piston portion 154A to release member 136A when ram 82 has fully or substantially retracted indicating that pin receiving members 76 are properly positioned on pin assemblies 65 for the next dump position of bucket 75. Further the selected predetermined strength of spring 155 should be such that longitudinal movement of piston portion 154A by the fluid pressure on the fluid end of cylinder 153 to lockingly engage member 136A in the right side dump position or the left side dump position occurs substantially before ram 82 is extended by the pressure fluid in conduit 152 to dump the bucket to the right side. Thus while the operator has the control lever in right side dump position and closes switch 158, solenoid valve 160 is closed if the right micro-switch 161 is closed. The closed valve 160 redirects pressure fluid to conduit 152 which first moves spring biased piston portion 154A to underlappingly engage member 136A to lock lever 130A in right side dump position. Then the ram 82 is extended to pivot bucket to the right side about right pin assembly 65.

When the operator intends to retract the extended ram 82, switch 158 is released to normally open position as shown in FIGURE 8 to open the battery sensing circuit and de-energize solenoid valve 160 to its normally open position. Then pressure fluid from inlet conduit 148 is passed through opened bypass conduit 149. Pressure fluid in line 152 then flows through the restricted orifice 150A also to bypass conduit 149. The restricted orifice controls the rate of flow of pressure fluid in conduit 152 such that the extended ram 82 is completely or substantially retracted before the spring biased piston 154 overcomes the pressure fluid in cylinder 153 to release the locked operator control lever 130A in the right side dump position. Then the operator lever 130A is free to pivot to the left side dump position. Shifting the lever to left side dump posiiton, pressure fluid passes through annular groove 106 to left conduit 142. If after right side dump bucket 75, left pin receiving member 76 is positioned to engage left pins 66, mechanical sensing device 143 will conduct pressure fluid to right pin assembly 65 for retraction of extended pins 66. Branch conduit 142A will insure outward extension of left pin 66. Then as the right pins 65 are retracted fluid pressure increases to open right check valve 147. Then if left pins 66 are fully extended in left pin receiving member as indicated by closed left micro-switch 161, the member 136A is overlappingly engaged by piston portion 154A upon closure of switch 158 to lock operator control lever 130A in the left side dump position and to extend ram 82 to dump the bucket 75 to the left side. It should now be apparent that to retract the bucket 75 dumped to the left side, the operational procedure is the same as that described above for retraction of the bucket dumped to the right side in FIGURE 8.

FIGURE 8A is a modification of FIGURE 8 in which an electrical sensing device is substituted for the mechanical sensing device 143. FIGURE 8A although showing only a portion of FIGURE 8 is the same other than the modification. The electrical sensing device includes a normally open micro-switch 165 mounted in a conventional manner on right pin assembly 65 to indicate proper position of right pin receiving member 76 with respect to engaging pins 66. Similarly, normally open micro-switch 171 is mounted on left pin assembly 65. Right micro-switch 165 forms part of an electrical circuit connected across battery powered line 159 namely lines 164 and 166 with micro-switch 165 therebetween and normally closed solenoid valve connected between lines 166 and 168. Both lines 164 and 168 are connected to line 159 to complete the construction of the electrical circuit. Similarly left micro-switch 171 forms part of an electrical circuit namely lines 169 and 172 with the switch 171 therebetween and normally closed solenoid valve 173 between lines 172 and 174. Lines 169 and 174 are connected to line 159 also. The purpose of solenoid valves 167 and 173 when energized is to permit passage of pressure fluid in left or right conduit 142 to pin assemblies 65 when pin receiving members 76 have been sensed by switches 165 and 171 to be in the proper engaged position for pins 66. Thus in FIGURE 8 when the operator moves control lever to right side dump position and closes operator switch 158 pressure fluid will flow past energized solenoid valve 167 in FIGURE 8A to left pin assembly 65 through conduit 142 to retract left pins 66 and through connected branch conduit 142A to assure outward extension of right pins 66, if right micro-switches 161 and 165 are closed. It should be remembered that the purpose of switch 165 is to indicate proper engaged position of pin receiving member 76 with right pin assembly 65. Correspondingly, switch 161 indicates full outward extension of right pins 66 to lockingly engage the right pin member 76. Closed switches 161 and 165 complete the electrical circuit from battery source 156. Similarly, when the operator control lever 130A is moved to left side dump position after completion of the operation for right side dump position as discussed above in describing FIGURE 8, the solenoid valve 173 is energized upon closing operator switch 158 if left switches 161 and 171 are closed indicating proper engaged position of left pin receiving member 76 and left pins 66. Energized valve 173 permits passage of pressure fluid to right pin assembly for retraction of pins 66 and to left pin assembly through branch conduit 142A to asure extension of left pins 66. It should now be readily apparent that the bucket 75 would dump to the left side. Thus the subject invention in FIGURES 8 and 8A has provided additional sensing devices to assure proper engaged position of one of the pin receiving members with properly outwardly extended pins 66 when dumping the bucket to one side about the one pin receiving member. Although the mechanical sensing device 143 in FIGURE 8 and the substituted electrical sensing devices 165 and 171 in FIGURE 8A have each been mounted and associated with the pin assemblies 65, it is equally within the skill of the art to mount these sensing devices 143, 165 and 171 at the transverse centers of the bucket carrier 40 shown in FIGURES 1-6 to sense the return of the rear wall portion of the curved bucket plate 77 and to prevent the loss of the bucket 75 when dumping to either side. This modification would replace the device which senses the engagement of pin receiving members 76 with the assemblies 65 that is discussed in connection with FIGURES 8 and 8A.

Having described the invention which is considered new and desired to be protected by Letters Patent is:

1. In a side dumping bucket assembly for a tractor loader, a bucket carrier, pin means mounted at a transversely spaced positions on each side of said carrier, bracket means mounted at transversely spaced positions on each side of said bucket and engaging said pin means whereby said bucket is supported by said carrier, the axes of said pin means being positioned to diverge forwardly from the longitudinal axis of the loader, and means for selectively releasing said bucket from one of said pin means whereby said bucket is pivotable about the axis of the other of said pin means.

2. In a tractor loader, a boom operatively carried on said tractor and extending forwardly thereof, a bucket carrier pivotally connected to the forward end of said boom, linkage means for pivoting said carrier relative to said boom, said bucket carrier comprising a plate member positioned generally transversely of said tractor, a pair of pin means secured to the forward side of said plate member of said carrier in a transversely spaced apart relationship to each other and releasably connected to the side walls of said bucket so that said bucket is supported on said carrier with the rearward wall of said bucket engaging the forward side of said plate member, the axes of said pair of pin means being positioned to diverge forwardly from the longitudinal axis of the loader, and means for selectively releasing said bucket from one of said pin means whereby said bucket is pivotable about the axis of the other of said pin means.

3. In a side dumping bucket assembly for a tractor loader, a bucket carrier, a pair of pin assemblies, a pair of retractable pins mounted in each assembly, said pin assemblies mounted on said carrier in a transversely spaced apart relationship to each other, said pin assemblies being positioned on said carrier so that the axes of said retractable pins diverge forwardly from the longitudinal axis of the loader, and a pair of pin-receiving members carried on said bucket and positioned to engage the pins of said pin assemblies.

4. In a side dumping bucket assembly for a tractor loader, a bucket carrier comprising a generally rectangular plate member, a pair of pin assemblies, at least one retractable pin mounted in each assembly, said pin assemblies secured to said carrier on the forward side of said plate member in a transversely spaced apart relationship to each other, said pin assemblies being positioned on said carrier so that the axes of said retractable pins diverge forwardly from the longitudinal axis of the loader, and a pair of pin-receiving members carried on the side walls of said bucket and positioned to engage the pins of said pin assemblies with the rearward side of said bucket engaging said plate member between said pin assemblies.

5. In a tractor loader, a boom operatively carried on said tractor and extending forwardly thereof, a bucket carrier pivotally connected to the forward end of said boom for pivotal movement relative to said boom about an axis disposed transversely of said tractor, linkage means for pivoting said carrier relative to said boom, a pair of pin assemblies, a pair of retractable pins mounted in each assembly, said retractable pin assemblies mounted on said carrier in a transversely spaced-apart relationship to each other, said pin assemblies being positioned on said carrier so that the axes of said retractable pins diverge forwardly from the longitudinal axis of the loader, a digging bucket, a pair of pin-receiving members carried on the side walls of said bucket and positioned to engage the pins of said pin assemblies, means for selectively retracting either of said pair of retractable pins to release said bucket from said carrier, actuating means connected to said bucket carrier and said bucket for pivoting the bucket on the unretracted pins.

6. In a tractor loader, a boom operatively carried on said tractor and extending forwardly thereof, a bucket carrier pivotally connected to the forward end of said boom for pivotal movement relative to said boom about an axis disposed transversely of said tractor, linkage means for pivoting said carrier relative to said boom, a pair of retractable pin assemblies, said retractable pin assemblies mounted on said carrier in a transversely spaced-apart relationship to each other, a digging bucket, a pair of pin-receiving members carried on the side walls of said bucket and positioned to engage the pins of said pin assemblies, means for selectively retracting either of said pin assemblies to release said bucket from said carrier, actuating means connected to said bucket carrier and said bucket for pivoting the bucket on the unretracted pin assembly, and means sensing the retaction of either pin assembly to prevent pivotal movement of said bucket about the retracted pin assembly.

7. In a tractor loader, a boom operatively carried on said tractor and extending forwardly thereof, a bucket carrier pivotally connected to the forward end of said boom for pivotal movement relative to said boom about an axis disposed transversely of said tractor, linkage means for pivoting said carrier relative to said boom, a pair of retractable pin assemblies, said retractable pin assemblies mounted on said carrier in a transversely spaced-apart relationship to each other, said pin assemblies being positioned on said carrier so that the axes of said pin assemblies diverge forwardly of said carrier, a digging bucket, a pair of pin-receiving members carried on the side walls of said bucket and positioned to engage the pins of said pin assemblies, means for selectively retracting either of said pin means to release said bucket from said carrier, actuating means connected to said bucket carrier and said bucket for pivoting the bucket on the unretracted pin assembly, and means sensing the retraction of either pin assembly to prevent pivotal movement of said bucket about the retracted pin assembly.

8. In a tractor loader, a boom operatively carried on said tractor and extending forwardly thereof, a bucket carrier comprising a substantially rectangular plate member, means pivotally connecting said plate member at the lower rearward side thereof on said boom for pivotal movement of said plate member about an axis disposed transversely of said tractor, linkage means pivotally connected to the upper rearward side of said plate member for pivoting said plate member relative to said boom, a pair of pin assemblies, at least one retractable pin mounted in each assembly, said pin assemblies mounted on the forward side of said plate member in a transversely spaced apart relationship to each other, said pin assemblies being positioned on said plate member so that the axes of said retractable diverge forwardly from the longitudinal axis of the loader, a digging bucket, and a pair of pin-receiving members carried on said bucket and positioned to engage the pins of said pin assemblies.

9. In a tractor loader, a boom operatively carried on said tractor and extending forwardly thereof, a bucket carrier pivotally connected to the forward end of said boom for pivotal movement of said carrier about an axis disposed transversely of said tractor, linkage means connected to said carrier for pivoting said carrier relative to said boom, a pair of hydraulically retractable pin assemblies, each of said pin assemblies comprising a body portion having a pair of coaxially opposing pins slidably carried in said body portion with one end of each of said pins extendable outwardly of said body portion, the other end of each of said pins being piston-shaped, and a coiled spring positioned between said other ends of said pins to bias said one end of said pins outwardly of said body portion, and passageway means for admitting hydraulic fluid to said piston-shaped portions of said pins to retract said one end of said pins inwardly of said body portion and against the bias of said coiled spring, the body portions of said pin assemblies being mounted on said carrier in a transversely spaced apart relationship to each other, said body portion of said pin assemblies being positioned on said carrier so that the axes of said pin assemblies diverge forwardly of said carrier, a digging bucket, and a pair of pin-receiving members carried on said bucket and positioned to engage the pins of said pin assemblies, and selectively operable hydraulic circuit means for delivering hydraulic fluid under pressure to the passageway means in one of said body portions of one of said pin assemblies for delivering hydraulic fluid under pressure to retract the pins thereof.

10. In a tractor loader as defined in claim 9, wherein said hydraulic circuit means comprises a valve selectively operable to positions on either side of a center operated position to deliver hydraulic fluid under pressure to one of said pin assemblies and to vent hydraulic fluid from the other of said pin assemblies, said valve being formed so that hydraulic fluid is vented from both of said pin assemblies in said center-operated position, and a valve-operating lever connected to said valve for manual selective operation of said valve to said center-operated position and said positions on either side thereof by manual movement of said lever.

11. In a tractor loader as defined in claim 10, and means cooperating with said lever and selectively operable to limit the movement of said lever between said center-operated position and one of said other positions of said valve.

12. In a tractor loader as defined in claim 9, a hydraulic ram, means pivotally connecting one end of said hydraulic ram to said carrier substantially at the upper transverse center thereof, means pivotally connecting the other end of said hydraulic ram to said bucket substantially at the upper transverse center thereof, and second hydraulic circuit means connecting said ram to said first hydraulic circuit means, said second hydraulic circuit means responsive to the retraction of the pins of one of said pin assemblies to deliver hydraulic fluid under pressure to said ram for extending said ram to pivot said bucket about the axis of the pins of the other of said pin assemblies.

13. In a tractor loader as defined in claim 12, wherein said first circuit means comprises a valve, and a pair of hydraulic fluid conduits connected at one end of each thereof to said valve, the other end of each of said conduits being connected to the passageway means in the body portions of one of said pin assemblies for delivering hydraulic fluid to said piston portions of the pins thereof, said valve being selectively operable to deliver hydraulic fluid under pressure to one of said conduits and to vent the other of said conduits, said second hydraulic circuit means comprising a check valve having a pair of inlets and an outlet, each of said inlets connected into one of said conduits, said outlets connected to said ram, and said check valve being responsive to a hydraulic fluid pressure substantially greater than the hydraulic fluid pressure required to cause retraction of the pins of one of said pin assemblies to interconnect said outlet and said inlets receiving hydraulic fluid under pressure.

14. In a tractor loader, a boom operatively carried on said tractor and extending forwardly thereof, a bucket carrier pivotally connected to the forward end of said boom for pivotal movement of said carrier about an axis disposed transversely of said tractor, linkage means connected to said carrier for pivoting said carrier relative to said boom, a pair of hydraulically retractable pin assemblies, each of said pin assemblies comprising a body portion having a pair of coaxially opposing pins slidably carried in said body portion with one end of each of said pins extendable outwardly of said body portion, the other end of each of said pins being piston-shaped, first passageway means for admitting hydraulic fluid to said piston-shaped portions of said pins to retract said one end of said pins inwardly of said body portion, second passageway means for admitting hydraulic fluid between said other end of said pins to extend said one end of said pins outwardly of said body portion, the body portions of said pin assemblies being mounted on said carrier in a transversely spaced apart relationship to each other, said body portion of said pin assemblies being positioned on said carrier so that the axes of said pin assemblies diverge forwardly from the longitudinal axis of the loader, a digging bucket, and a pair of pin-receiving members carried on said bucket and positioned to engage the pins of said pin assemblies, and selectively operable hydraulic circuit means for delivering hydraulic fluid under pressure to said first passageway means in one of said body portions of one of said pin assemblies to retract inwardly the pins thereof and to said second passageway means in the other of said body portions of the other of said pin assemblies to extend outwardly the pins thereof.

15. In a tractor loader as defined in claim 14, hydraulic operating means comprising a ram for operating said bucket, a fluid line connecting said ram to said hydraulic circuit means and a bypass means to vent said fluid line for preventing operation of said ram; and means sensing the extension of the pins in at least one of said pin assemblies and operating said bypass means to vent said fluid line when said pins in at least one of said pin assemblies are not extended.

16. In a tractor loader as defined in claim 14, wherein said first circuit means comprises a valve, and a pair of hydraulic conduits each connected at one end to said valve, the other end of said conduits being connected to the passageway means in said body portions of said pin assemblies for delivering hydraulic fluid to said piston portions of the pins thereof, said valve being selectively operable to deliver hydraulic fluid under pressure to one of said conduits and to vent the other of said conduits, sensing means operatively associated with said body portions to assure proper positioning of said pin-receiving members on said body portions, said sensing means preventing delivery of hydraulic fluid to said body portions for extension and retraction of said pins when said pin receiving members are not properly positioned to engage the pins of said pin assemblies, a second hydraulic circuit means comprising a ram for operating said bucket, two pressure regulating check valves each having an inlet connected to one of said conduits and an outlet, and a fluid line connecting said outlets to said ram; and each of said check valves being responsive to a hydraulic fluid pressure substantially greater than the hydraulic fluid pressure required to cause retraction and extension of the pins of said pin assemblies to interconnect said outlet and said inlet of said check valve receiving hydraulic fluid under pressure.

17. In a tractor loader, a boom operatively carried on said tractor and extending forwardly thereof, a bucket carrier pivotally connected to the forward end of said boom for pivotal movement of said carrier about an axis disposed transversely of said tractor, linkage means connected to said carrier for pivoting said carrier relative to said boom, a pair of hydraulically retractable pin assemblies, each of said pin assemblies comprising a body portion having a pair of coaxially opposing pins slidably carried in said body portion with one end of each of said pins extendable outwardly of said body portion, the other end of each of said pins being piston-shaped, means between said other ends of said pins to extend said one end of said pins outwardly of said body, passageway means for admitting hydraulic fluid to said piston-shaped portions of said pins to retract said one end of said pins inwardly of said body portion and against said means between said other end of said pins, the body portions of said pin assemblies being mounted on said carrier in a transversely spaced apart relationship to each other, said body portion of said pin assemblies being positioned on said carrier so that the axes of said pin assemblies diverge forwardly of said carrier, a digging bucket, and a pair of pin receiving members carried on said bucket and positioned to engage the pins of said pin assemblies, and selectively operable hydraulic circuit means for delivering hydraulic fluid under pressure to the passageway means in one of said body portions of one of said pin assemblies to retract the pins thereof.

18. In a tractor loader as defined in claim 17, a reciprocating hydraulic ram, means pivotally connecting one end of said hydraulic ram to said carrier substantially at the upper transverse center thereof, means pivotally connecting the other end of said hydraulic ram to said bucket substantially at the upper transverse center thereof, said hydraulic circuit means being further formed to operate responsive to the retraction of the pins of one of said pin assemblies to deliver hydraulic fluid under pressure to said ram for extending said ram to pivot said bucket about the axis of the pins of the other of said pin assemblies, sensing means operatively associated with each of said pin receiving members and each of said pins, said sensing means to prevent the further operable response of said hydraulic circuit means to extend said ram to pivot said bucket about the axis of the other of said pins when said other pin receiving member is not positioned to properly engage said other pins of said other body portion, and further when said other pins are not extended to lockingly engage said other pin receiving member.

19. In a tractor loader, a boom operatively carried on said tractor and extending forwardly thereof, a bucket carrier pivotally connected to the forward end of said boom for pivotal movement relative to said boom about an axis disposed transversely of said tractor, linkage means for pivoting said carrier relative to said boom, a pair of retractable pin assemblies, said retractable pin assemblies mounted on said carrier in a transversely spaced-apart relationship to each other, a digging bucket, a pair of pin-receiving members carried on the side walls of said bucket and positioned to engage the pins of said pin assemblies, means for selectively retracting either of said pin means to release said bucket from said carrier, actuating means connected to said bucket carrier and said bucket for pivoting the bucket on the unretracted pin assembly, and means sensing the retraction of either pin assembly and the non-engagement of either pin-receiving member with the pin assembly to prevent pivotal movement of said bucket about the retracted pin assembly and the unengaged pin-receiving member.

20. In a tractor loader, a boom operatively carried on said tractor and extending forwardly thereof, a bucket carrier pivotally connected to the forward end of said boom for pivotal movement relative to said boom about an axis disposed transversely of said tractor, means for pivoting said carrier relative to said boom, a pair of pin assemblies mounted on said carrier in a transversely spaced-apart relationship to each other, at least one retractable pin mounted in each assembly, a bucket, a pair of pin receiving members carried on said bucket and positioned to engage the pins of said pin assemblies, first hydraulic means for selectively retracting the pin in either of said pin assemblies from engagement with its associated pin receiving member, second hydraulic actuating means connected to said bucket carrier and said bucket for pivoting the bucket on the pin assembly having the unretracted pin, and valve means responsive to fluid pressure in said first hydraulic means greater than that required to cause retraction of said pins to condition the second hydraulic actuating means for operation thereof.

21. In a side dumping bucket assembly for a tractor loader, a bucket carrier, a bucket, pin means mounted on said carrier, bracket means mounted on said bucket and engaging said pin means whereby said bucket is pivotally supported by said carrier, the axis of said pin means diverging forwardly from the longitudinal axis of the loader, and means to pivot said bucket about the axis of said pin means.

22. In a tractor loader as defined in claim 14, wherein said hydraulic circuit means comprises a valve movable between a neutral position and a pair of operating positions in which hydraulic fluid is selectively delivered to one of said pin assemblies and vented from the other of said pin assemblies, said valve being formed so that when in its neutral position hydraulic fluid is vented from both of said pin assemblies, a valve operating lever connected to said valve for manual selective movement of said valve, and sensing means operatively associated with said pins and said hydraulic circuit means for making said hydraulic circuit means operable to deliver hydraulic fluid to said passageway means only when said pins are extended in at least one of said pin assemblies, a ram for operating said bucket, hydraulic operating means for operating said ram, and means responsive to the fluid pressure in said hydraulic operating means for locking the valve operating lever with said valve in one of its operating positions when said sensing means indicates extension of said pins in at least one of said pin assemblies.

23. In a tractor loader as defined in claim 22, said means responsive to the fluid pressure in said hydraulic operating means comprising a rearward projection member operatively associated with said operating lever and fixedly positioned in angular relation thereto, a fluid cylinder including a spring biased piston, said piston comprising a longitudinal reduced portion, said reduced portion of said piston being fluidly movable to engage said rearward projection member so that said manually movable operating lever is lockingly held in said positions other than said neutral position.

References Cited by the Examiner

UNITED STATES PATENTS

| | | | |
|---|---|---|---|
| 2,047,051 | 7/1936 | Armington et al. | 298—17.7 |
| 2,130,618 | 9/1938 | Gnavi | 60—97 |
| 2,821,313 | 1/1958 | Warner | 214—140 |
| 2,953,408 | 9/1960 | Koenig | 298—17.7 X |
| 3,022,910 | 2/1962 | Anderson et al. | 214—140 |
| 3,144,147 | 8/1964 | Boughton | 214—140 |

FOREIGN PATENTS 582,493    9/1958    Italy.

HUGO O. SCHULZ, *Primary Examiner.*

G. CRUTSINGER, *Assistant Examiner.*